United States Patent
Timmermann

[11] 4,137,060
[45] Jan. 30, 1979

[54] METHOD OF FORMING A LENS AT THE END OF A LIGHT GUIDE

[75] Inventor: Christian Timmermann, Eschollbrucken, Fed. Rep. of Germany

[73] Assignee: Robert Bosch GmbH, Stuttgart, Fed. Rep. of Germany

[21] Appl. No.: 853,138

[22] Filed: Nov. 21, 1977

Related U.S. Application Data

[63] Continuation-in-part of Ser. No. 816,892, Jul. 18, 1977, abandoned.

[51] Int. Cl.² .................... C03C 15/00; C03B 11/08; G02B 5/14
[52] U.S. Cl. ........................................ 65/31; 65/37; 65/DIG. 7; 350/96.18
[58] Field of Search ............ 65/37, DIG. 7, 31; 350/96.18

[56] References Cited
U.S. PATENT DOCUMENTS

| | | | |
|---|---|---|---|
| 1,466,973 | 9/1923 | Takanashi | 65/37 X |
| 3,288,585 | 11/1966 | Clarke | 65/37 |
| 3,492,058 | 1/1970 | Waldman | 350/96.18 |
| 3,666,347 | 5/1972 | Kitano et al. | 65/37 |
| 3,724,924 | 4/1973 | Lenfant et al. | 65/37 X |
| 4,067,937 | 1/1978 | Unno et al. | 65/37 X |

FOREIGN PATENT DOCUMENTS

| | | | |
|---|---|---|---|
| 2517019 | 10/1976 | Fed. Rep. of Germany | 350/96.18 |
| 2330022 | 10/1975 | France | 350/96.18 |

OTHER PUBLICATIONS

O. Appl. Pay. vol. 44, No. 6, Jun. 1973, Light Coupling From a Stripe-Geometry GaAs Diode Laser 114 to an Optical Fiber with Spherical End.

*Primary Examiner*—S. Leon Bashore
*Assistant Examiner*—Frank W. Miga
*Attorney, Agent, or Firm*—Flynn & Frishauf

[57] ABSTRACT

The jacket of a cored light guide is completely or partially etched away; or, if the light guide is a gradient fiber guide, it is etched to about the light guiding diameter. A lens is then adhered to the end of the fiber, the lens being made of a material having a melting point which is low in relation to the melting point of the core material, to result in a light guide having an essentially semispherical lens at the end; adhesion may be effected by melting on a lens of lower melting point glass, or by making the lens of transparent epoxy, a drop of which can be cured on the light guide to form the lens.

9 Claims, 3 Drawing Figures

METHOD OF FORMING A LENS AT THE END OF A LIGHT GUIDE

The present application is a Continuation-In-Part of my earlier application, Serial No. 816,892, filed July 18, 1977, now abandoned.

The invention relates to a method to couple a light guide to a semiconductor radiator such as a laser, and more particularly to a light guide of tiny diameter, e.g., in the 100 μm range.

BACKGROUND AND PRIOR ART

Known methods to couple light guide filaments to semiconductor radiators have many difficulties associated therewith due to the small diameter of the cooperating opto-electronic elements. The light guides made in accordance with this method have only mediocre efficiency.

"Applied Optics", Vol. 14, No. 12, Dec. 1975, pp. 2815 to 2816 describes methods to couple optical fibers to semiconductor lasers. The ends of the light guide are melted so that, instead of a flat end portion, a semispherical lens dome ought to result. Couplings for light guide filaments made according to this method do not, however, have the necessary semispherical shape of the core necessary for low-loss coupling. Rather, upon melting, the cladding or jacket material either becomes plastic before the core material so that it pulls in, forming a pupil-like orifice, or the core material becomes soft before the cladding material and, under the influence of surface tension, only a flat lens with long focal length will result at the end of the fiber. The desired, approximately semispherical shape of the end of the fiber with a spherical radius which corresponds approximately to the radius of the core was obtained only in a single case under special experimental conditions which were not transferable to routine manufacture of other light guide fibers.

The Invention

It is an object to provide a light guide and a method to make a light guide which has a lensatic end capable of being coupled to a radiator, and more particularly to a semiconductor radiator such as a semiconductor laser which light guide has a high degree of coupling efficiency, and thus has an end portion which is essentially semispherical throughout the diameter of the light guiding element of the light guide itself.

Briefly, a lens made of a material having a lower melting point than that of the light guide core and/or jacket material is adhered to the end of the light guide. The diameter of the light guide is first reduced in the region of its end portion so that the lens which is attached to the light guide, and of essentially semispherical shape, can be directly adhered to the end thereof.

In accordance with a feature of the invention, the reduction of the diameter of the light guide is obtained by etching the light guide. The lens element may be attached to the light guide by melting it on, or, if he lens is a transparent epoxy, by curing a drop thereof at the end of the light guide. Preferably, the index of refraction of the material of the attached semispherical lens corresponds essentially to the index of refraction of the core. If the light guide is of glass, the lens may, for example, be an epoxy resin; if the light guide is of quartz glass, the lens may be a low melting point glass, or glass mixture. The lower melting point of the glass permits contacting the melt by the light guide fiber, e.g., from above, and adhering a drop, without danger that the cladding of the fiber itself will melt and deform. The method, and the light guides made in accordance with the method of the invention, have the advantage, with respect to those of the prior art, that the desired shape of the end of the core filament can be obtained with all customary light guide filaments and the results obtained are reproducible with high reliability.

Drawings, illustrating an example:

Figure 1:
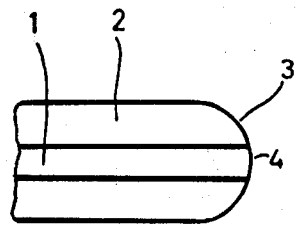
FIG. 1 illustrates a coupling end of a core fiber with a thick jacket made in accordance with the above-described prior art method.

A jacketed core fiber (FIG. 1) has a relatively thin light-conducting core 1 within a relatively thick cladding or jacket 2. The indices of refraction between the core and the jacket are different with respect to each other so that, at the interface surface between core 1 and jacket 2, total reflection will result for light rays guided in the core under a suitable angle. Upon softening the end portion of the fiber to melting temperature to obtain a lensatic dome 3, a semispherical shape of the overall light guide is obtained in the best case. However, the core 1 itself will have only a relatively flat spherical end portion 4 thereon which is a minor portion of an entire semisphere.

Figure 2:
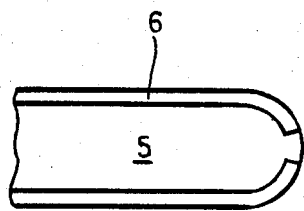
FIG. 2 is a fiber with thin jacket having a melting point lower than that of the core, and likewise made in accordance with the prior art.

FIG. 2 illustrates a light guide fiber with a thin jacket 6 surrounding the core 5. Upon softening the end of the fiber to melting temperature, jacket 6 draws itself around the opening of the core in diaphragm, or pupil, or orifice shape due to the prevailing surface tension relationships, so that only a small entrance pupil of small diameter will remain free. The efficiency of coupling is very low. The spherical portion towards the entrance opening, also in this case, is comparatively flat. This is undesirable.

It is difficult to mechanically work the light guide fibers due to their small dimension, typically an 80 μm core diameter and a 130 μm overall diameter. Therefore, operation by melting of the fiber end has been deemed to be advantageous.

Figure 3:
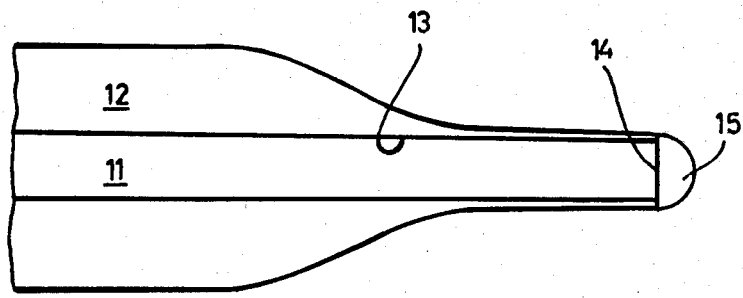
FIG. 3 illustrates a coupling end of a quartz-core jacketed fiber made in accordance with the method of the invention.

The invention is described with reference to FIG. 3. A cladded, or jacketed core fiber, similar to FIG. 1, contains a core 11 surrounded by a jacket 12. To avoid that configurations corresponding to FIGS. 1 and 2 result, upon melting of the fiber end, the jacket or cladding 12 is almost completely removed in the vicinity of the end of the fiber over a predetermined distance. This can be done, for example, by etching. In case of step-index fibers, care must be taken to prevent complete removal of the jacket since, otherwise, the interface 13 between the core 11 and the jacket 12, necessary for total reflection, will be lost. After etching, the end of the fiber is plane-finished as preliminary preparation step to attach a separate semispherical lens element 15. If it were attempted to give the end of the fiber the desired shape by simply melting then, due to surface tensions, a shape similar to that shown in FIG. 2 will result since the portion of the jacket which remains will draw itself partially around the end face opening of the jacket 11. In accordance with a feature of the invention, the plane-finished flat fiber end 14 has a semispherical lens 15 adhered thereto by melting it unto the end 14 of the fiber. The lens is made of a material having a lower melting point than that of the core or of the jacket of the light guide 11,12 itself, so that the cladding will not draw around the fiber as in FIG. 2. This semispherical lens 15, preferably, has the same index of refraction as the core material so that, upon transition of light between the lens 15 and the core 11, no reflection or light losses will result.

In case a gradient light guide is used in which the refraction index decreases from the center to the edge in accordance with a predetermined function, the preparation is done in the same manner as above described. Here, also, the end of the fiber is etched off up to the desired diameter and the so prepared plane-ground end has a semispherical lens attached thereto, e.g. by melting on. The lens is made of a material having a lower melting point, which is transparent, and having nearly the same index of refraction as the core of the guide. A simple melting process of the fiber, as in the prior art, would also lead to the result that melted portions from the edge regions and having a different index of refraction penetrate forwardly up to approximately the center of the entrance opening, and degrade the optical properties (FIG. 2). If the light guide fiber is of glass, the semispherical lens to be adhered may consist, for example, of an epoxy resin; when using a quartz glass fiber, the lens can consist of a glass or glass mixture having a lower melting point.

Lens element 15 which is made of epoxy resin, which is transparent, can either be melted-on, or adhered by the adhesive quality of the epoxy itself. To attach the lens element 15, the diameter of the light guide is reduced as described, for example by etching, but leaving the interface 13 if the light guide is of the step-index type, thus leaving sufficient material to provide the sharp gradient for reflection. The end 14 is finished as above-described. A flowable, or still plastic mass of epoxy, that is, resin plus curing agent or hardener, already mixed, and which will cure to a transparent material is prepared, and the flat end of the glass fiber is touched, from above, with the fluid mass of epoxy. A drop will adhere to the end face 14 which is lifted off the surface of the fluid epoxy mass. This drop will draw together into semispherical shape, as shown in FIG. 3 at 15. The result, again, will be as essentially semi-spherical transparent lens having a sphere diameter corresponding essentially to the diameter of the fiber in the region of the interface 14.

Various changes and modifications may be made within the scope of the inventive concept.

I claim:

1. Method to make a light guide having a coupling to couple a light guide fiber to a radiator comprising the steps of
   reducing the cross section of the light guide fiber (11, 12, 13) in the region of its end portion to just about the core (11) of the fiber and leaving an interface (13);
   and attaching an essentially semispherical lens (15) of a lower melting point material than the light guide fiber to the end face (14) of the light guide fiber.

2. Method according to claim 1, including the step of plane-finishing the end face (14) of the light guide fiber (11, 12, 13) before melting-on the lens to the end of the light guide.

3. Method according to claim 1, wherein the cross section reduction step comprises etching the light guide.

4. Method according to claim 1, wherein the attaching step comprises preparing the material of the lens in fluid form, and contacting the end surface (14) of the light guide fiber with the fluid material to adhere a drop thereof to the end of the light guide fiber, said drop drawing together to form an essentially semicircular lens.

5. Method according to claim 1, wherein the attaching step comprises heating the material of the lens to melting temperature at the surface to be adhered to the light guide fiber, and attaching the light guide fiber to the fluid lens by melting-on.

6. Method according to claim 1, wherein the attaching step comprises placing a drop of uncured epoxy of the material of the lens at the end of the light guide fiber and permitting said drop of uncured epoxy to cure.

7. Method according to claim 4, wherein the step of contacting the end surface (14) of the light guide fiber comprises touching the fluid material of the lens with the end surface (14) of the light fiber (11, 12, 13) from above, and then withdrawing the light guide fiber, to pick up a drop of the fluid material which will form the lens (15).

8. Method according to claim 1, wherein the light guide fiber comprises a core (11) and a jacket or cladding (12) having an index of refraction different from that of the core and the diameter reduction step comprises reducing the cladding, or jacket (12) to just above the diameter of the core (11).

9. Method according to claim 1, wherein the light guide fiber is a gradient fiber, and the cross section reduction step comprises reducing the diameter of the light guide fiber just above the diameter thereof where the index of refraction differs substantially from that of the central portion of the light guide fiber.

* * * * *